United States Patent [19]

Saito

[11] Patent Number: 4,775,861

[45] Date of Patent: Oct. 4, 1988

[54] DRIVING CIRCUIT OF A LIQUID CRYSTAL DISPLAY PANEL WHICH EQUIVALENTLY REDUCES PICTURE DEFECTS

[75] Inventor: Takeshi Saito, Tokyo, Japan

[73] Assignee: NEC Corporation, Tokyo, Japan

[21] Appl. No.: 667,887

[22] Filed: Nov. 2, 1984

[51] Int. Cl.⁴ .............................................. G09G 3/36
[52] U.S. Cl. .................................... 340/784; 340/719; 350/333
[58] Field of Search ............... 340/784, 718, 719, 765, 340/715; 365/200, 63, 149; 350/333

[56] References Cited

U.S. PATENT DOCUMENTS

| | | | |
|---|---|---|---|
| 3,938,140 | 2/1976 | Garcia et al. | 340/765 |
| 4,023,890 | 5/1977 | Shirasu et al. | 340/765 |
| 4,301,450 | 11/1981 | Smoliar | 340/715 |
| 4,368,523 | 1/1983 | Kawate | 340/784 |
| 4,600,274 | 7/1986 | Morozumi | 340/784 |

FOREIGN PATENT DOCUMENTS

| | | |
|---|---|---|
| 0186086 | 12/1984 | European Pat. Off. . |
| 60-97322 | 5/1985 | Japan . |
| 60-186823 | 9/1985 | Japan . |

OTHER PUBLICATIONS

A. J. Snell et al, "Applications of Amorphous Silicon Field Effect Transistors in Addressable Liquid Crystal Display Panels", Applied Physics, No. 24 (1981), pp. 357-362.

Article "Promise and Challenge of Thin-Film Silicon Approaches to Active Matrices", Lakatos, IEEE Transactions on Electron Devices, vol. ED-30, No. 5, May 1983.

Primary Examiner—Gerald L. Brigance
Assistant Examiner—Jeffery A. Brier
Attorney, Agent, or Firm—Burns, Doane, Swecker & Mathis

[57] ABSTRACT

A driving circuit of a liquid crystal display panel comprises a plurality of scanning lines, a plurality of signal lines arranged orthogonally to the scanning lines and a plurality of switching elements disposed at each of crossing points of the scanning lines and the signal lines, and liquid crystal display elements coupled to the respective switching elements, the switching elements being switched by signals at said scanning lines to drive the associated liquid crystal display elements.

10 Claims, 4 Drawing Sheets

DRIVING CIRCUIT OF A LIQUID CRYSTAL DISPLAY PANEL WHICH EQUIVALENTLY REDUCES PICTURE DEFECTS

BACKGROUND OF THE INVENTION

1. Field of the Invention:

This invention relates to a driving circuit for a liquid crystal display panel, and more particularly to an improvement of the driving circuit for equivalently reducing picture defects.

2. Description of the Prior Art:

Matrix type large area displays have been developed as means for displaying graphs, characters and images. Among various kinds of such displays, liquid crystal display panels have considerable potential. A typical structure is shown in "Applied Physics" No. 24 (1981) pp. 357 to 362, A. J. Snell, et al. "Application of Amorphous Silicon Field Effect Transistors in Addressable Liquid Crystal Display Panels" and has a glass substrate on which a plurality of thin film MOS field effect transistors (hereinafter, referred to as a TFT) as switching elements are mounted in a matrix form which is covered with a transparent cover plate with liquid crystal inserted between the glass substrate and the transparent cover plate. The inner surface of the cover plate is coated with a transparent conducting layer of Indium Tin Oxide (ITO). The transmittance of the liquid crystal to respective picture elements is controlled by selectively driving the TFT's. The TFT's are formed in a polycrystalline silicon layer or an amorphous silicon layer. By use of the TFT's, the resolution rises to the extent practical, but the density of picture defects is not reduced. It is impossible by present production techniques to increase the yield of TFT's up to one. The picture elements corresponding to the defective TFT's appear as picture defects. If the yield of the TFT's is assumed as 99.9%, 250 picture defects appear on a display panel having picture elements in a matrix of 500 rows and 500 columns. Such a defective image cannot be practically used in a market. Further, the high density of picture defects limits the application of the liquid crystal display panels to small size displays.

SUMMARY OF THE INVENTION

It is a primary object of the present invention to provide a liquid crystal display panel in which picture defects are equivalently reduced.

According to the present invention, the liquid crystal display panel comprises a plurality of scanning lines receiving scanning signals, a plurality of signal lines arranged orthogonally to the scanning lines and receiving driving signals, a plurality of sets of a plural number of switching elements, each set being disposed at a crossing point of the scanning line and the signal line and a plurality of liquid crystal elements coupled with the respective switching elements, the driving signals being applied to the liquid crystal elements through the switching elements in response to the scanning signals.

Each liquid crystal element at each crossing point of scanning and signal lines is divided into two or more in accordance with this invention, and two or more TFT's as the switching elements are disposed there to drive the divided liquid crystal elements. Therefore, if one TFT at one picture element is defective, the other TFT or TFT's drive the associated liquid crystal element or elements at that picture element. Although some of the switching elements are imperfect, it is visually seen as non-defective. Thus, the picture defects are equivalently reduced. This equivalent defect reduction is similarly obtained, even if the overall number of picture elements is made large, resulting in a possibility of application of liquid crystal to large area display panels.

BRIEF DESCRIPTION OF THE DRAWINGS

The above and further objects, features and advantages of the present invention will become more apparent from the following detailed description taken in conjunction with the accompanying drawings, wherein.

Figure 1:
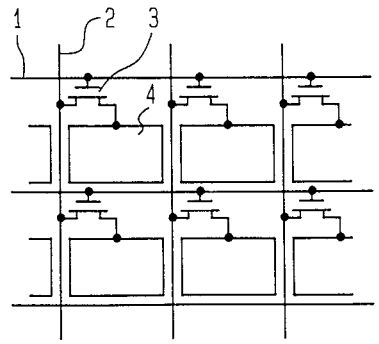
FIG. 1 is an exemplary circuit diagram of a part of driving circuit panel used in a liquid crystal display panel of the prior art.

A driving circuit panel in the prior art is shown in FIG. 1. A plurality of parallel scanning lines 1 are deposited on a glass substrate. A plurality of signal lines 2 are arranged orthogonally to the scanning lines 1 on the glass substrate. Every crossing accompanies one TFT3 with a gate connected to the scanning line 1, a source connected to the signal line 2 and a drain connected to a lower electrode 4. In an actual design, parts of the scanning lines 1 at the crossing with signal line 2 are used as gate electrodes of the TFT3. After the scanning lines 1 are covered with an insulator film, polycrystalline silicon or amorphous silicon is deposited on the insulator film at the parts of the scanning lines 1 as a semiconductor material. Source electrodes continuous to the signal lines 2, and drain electrodes continuous to the lower electrode 4 are formed on the semiconductor material at both sides of the scanning lines 1. Thus, TFT's 3 are formed at every crossing of scanning and signal lines.

Figure 2:
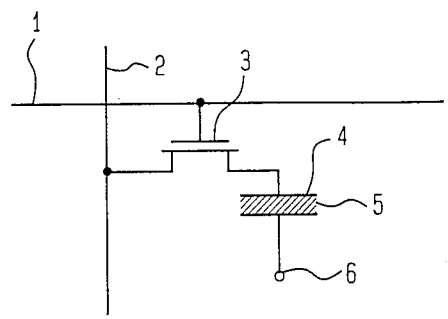
FIG. 2 is a circuit diagram of one element of the liquid crystal display panel using the prior art driving circuit of FIG. 1.

The lower electrodes are electrodes to apply driving voltages to liquid crystal in picture elements. Thus, a prepared driving circuit panel is covered with liquid crystal via a shading film, a passivation film and an orientation film. A transparent cap having a deposited transparent conductive layer as an upper electrode on a lower surface covers the liquid crystal. The driving voltage is applied to the liquid crystal between the lower electrode connected to TFT3 selected by scanning and signal voltage and the upper electrode. This structure is shown in FIG. 2 in the form of a circuit diagram in which the liquid crystal is referred to as the numeral 5 and the upper electrode as the numeral 6.

Figure 3A:
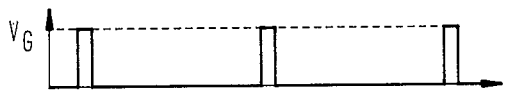
FIG. 3 is a timing chart of a scanning signal $V_G$ applied to scanning lines.
FIG. 3b is a timing chart of a driving signal applied to signal lines.
FIG. 3c is a timing chart of voltage $V_{LC}$ applied to the liquid crystal of a picture element.
Figure 3B:
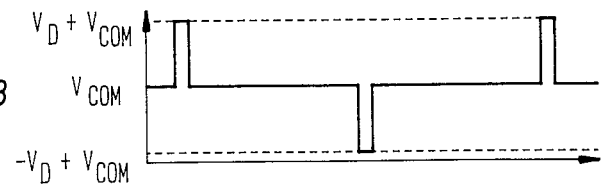
Figure 3C:
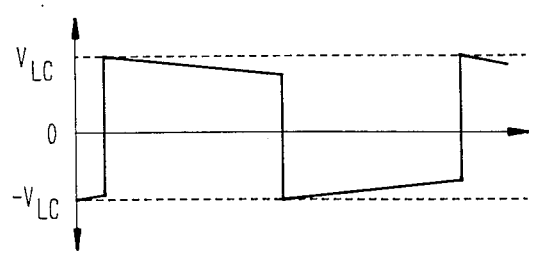

The scanning of TFT's 3 and the driving of liquid crystal will now be explained with reference to FIGS. 3a, 3b and 3c. Scanning signal $V_G$ is an intermittent pulse having a width of several tens of $\mu$sec, a height of 12 volts and a repetition period of 16.7 msec, as shown in FIG. 3a. The scanning of the display is performed by shifting the phases of pulses in accordance with the scanning lines 1. The information to be reproduced on the display panel is applied on the signal lines in synchronism with the scanning signal. The signal voltage depends on the information and is lower than 10 volts. The polarity of the signal voltage is changed alternately at every scanning period to prevent the liquid crystal from deterioration. In a case where the voltage $V_{com}$ such as a ground potential is applied to the upper electrode 6, the timing chart of the driving signal may be expressed as FIG. 3b. The signal voltage is charged into the liquid crystal through TFT3 selected by the scanning signal. The voltage $V_{LC}$ across the liquid crystal is shown in FIG. 3c. The peak voltage is about 8 volts as a result of a voltage loss at TFT3 etc. When the voltage $V_{LC}$ is at the peak, the liquid crystal lowers its transmitters, if the liquid crystal is of the twisted nematic type.

A problem in the prior art liquid crystal display panels is picture defects based on defective TFT's. One TFT is used at one crossing for one picture element. Therefore, the picture element coupled with the defective TFT does not work. As mentioned in the introductory part of this specification, if the yield of the TFT is 99.9%, the number of defective picture elements is 250 in a display panel having a matrix of picture elements of 500 rows and 500 columns. Such defective display does not have any worth in a market. It is impossible by the present production technique to raise the yield more than 99.9%.

DESCRIPTION OF THE PREFERRED EMBODIMENTS

Figure 4:
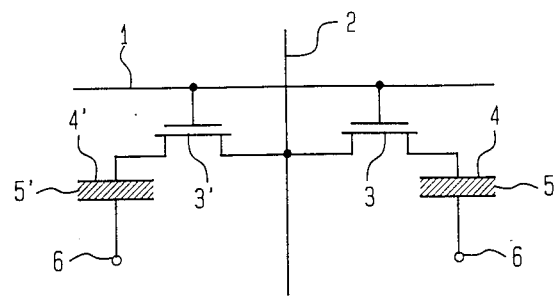
FIG. 4 is a circuit diagram of one element of the liquid crystal display panel using the driving circuit according to a first embodiment of the present invention.

Referring to FIG. 4, each picture element at each crossing of a scanning line 1 and a signal line 2 consists of two sets of a thin film MOS field effect transistor 3(3') and a liquid crystal display element with a lower electrode 4(4'), liquid crystal 5(5') and an upper electrode 6, according to the first embodiment of the present invention. Gates of the TFT's 3 and 3' are commonly connected with the scanning line 1, and their sources are also commonly connected with the signal line 2. Thus, it can be said that one conventional picture element is divided into two at each crossing. If one of the TFT's is defective, the other drives the associated liquid crystal display element, resulting in reduction of area of defective elements on the display panel. The information of the picture element is maintained on the display panel by the non-defective part with a reduced area. The visual naturalness is kept on the display panel.

Figure 5:
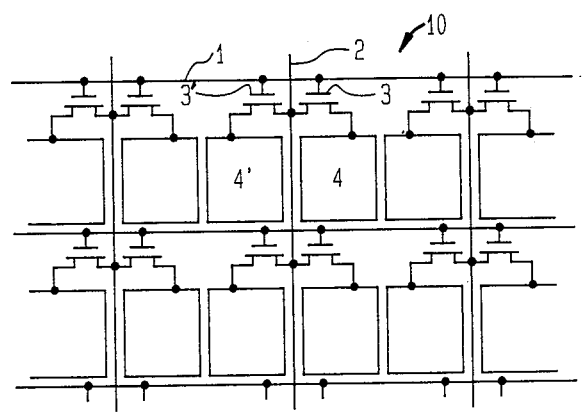
FIG. 5 is an explanatory circuit diagram of a part of driving circuit panel used in the first embodiment of the present invention.

One part of the driving circuit panel is explanatory shown in FIG. 5. A plurality of scanning lines 1 are formed on a glass substrate 10. A plurality of signal lines 2 are also formed on the glass substrate but isolated from the scanning lines. At every crossing of the scanning lines 1 and the signal lines 2, TFT's 3 and 3' are formed on both sides of the signal lines 2. Gates are connected wit the scanning line 1 and sources are with the signal line 2. Drains are respectively connected with lower electrodes 4 and 4' each having a width of 100 $\mu$m and a length of 200 $\mu$m. The TFT's 3 and 3' have polycrystalline silicon or amorphous silicon as a semiconductor material which is disposed on the scanning line 4 via an insulator film. The whole panel is covered with a shading film, a passivation film and an orientation film on which liquid crystal, such as the twisted nematic type is disposed. A cover plate of the liquid crystal is composed of a transparent insulator plate having a transparent conductive layer on the inner surface. The transparent condctive layer operates as a common upper electrode of the liquid crystal display elements.

Here, the yield of the TFT's is assumed as 99.9%. If the display panel has a matrix of picture elements of 500 rows and 500 columns, 500,000 liquid crystal display elements are formed and the same number of TFT's are constructed on one panel. The number of defective TFT's are 500, causing 500 non-working liquid crystal display elements. However, the number of the picture elemehts, or crossing points, where both of the two TFT's are defective is only $\frac{1}{2}$. In other words, the number of the defective picture elements is reduced to 1/500 of the prior art structure. Almost all picture elements present visual information. By determining the driving voltage such that the non-defective liquid crystal display element in a picture element including a defective TFT is driven to make the transmittance of liquid crystal double, the picture on the display panel visually becomes a non-defective picture. The transmittance of liquid crystal may be made double by raising the driving voltage in synchronism with the drive of the TFT pair including a defective TFT. One example of the synchronization is the use of semiconductor memories.

Figure 6:
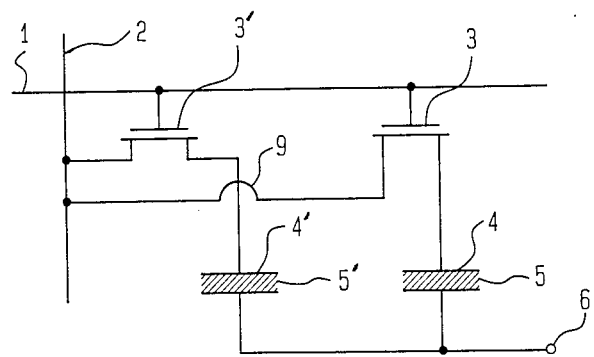
FIG. 6 is a circuit diagram of a mcdification of one element of the liquid crystal display panel used in the first embodiment of the present invention.

According to one modification of the first embodiment shown in FIG. 6, both of two TFT's 3 and 3' are disposed on one side of a signal line 2. Although this modification has a same visual effect as the display panel explained with reference to FIGS. 4 and 5, it has a slight difficulty in the manufacturing process. A source wiring of the TFT 3 requires a crossing a with a drain wiring of the TFT 3'. Therefore, a multiple wiring technique is required in the manufacturing process in addition to the photolithographic technique and etching technique which are mainly required in the production of the display panel shown in FIGS. 4 and 5.

Figure 7:
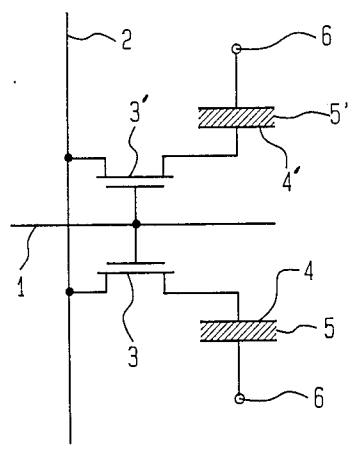
FIG. 7 is a circuit diagram of another modification of one element of the liquid crystal display panel used in the first embodiment of the present invention.

Another modification is shown in FIG. 7 in which TFT's 3 and 3' are disposed on both sides of the scanning line 1. This modification does not require the multiple wiring technique, unlike the modification shown in FIG. 6. However, because the scanning line 1 cannot be directly used as gates of both TFT's 3 and 3', additional conductive layers continuous to the scanning line 1 are required for the gates of the TFT's 3 and 3'. These additional conductive layers occupy only a small additional area for the driving circuit on the display panel and do not require a particular production technique with a mask change for etching. Therefore, this modification provides almost the same advantages in the visual effect and the production technique.

Figure 8:
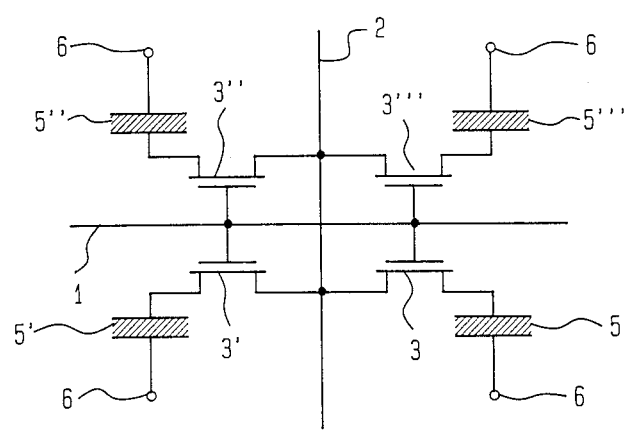
FIG. 8 is a circuit diagram of one element of the liquid crystal display panel used in a second embodiment of the present invention.
Figure 9:
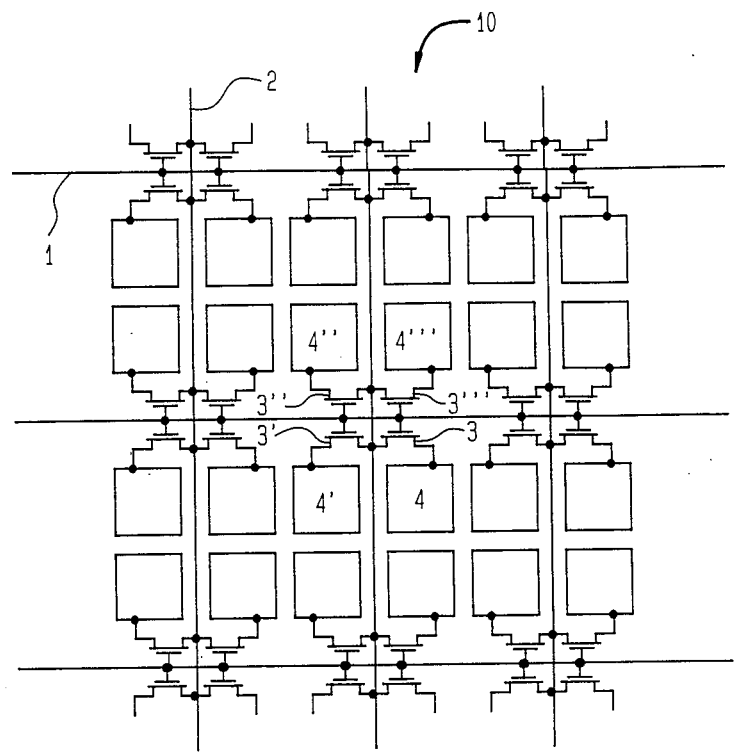
FIG. 9 is circuit diagram of a part of the driving circuit panel used in the second embodiment of the present invention.

The second embodiment of the present invention has four sets of TFT's and liquid crystal display elements for one picture element as shown in FIGS. 8 and 9. The arrangement of one picture element is shown in FIG. 8. Two TFT's 3 and 3''' are disposed on the right-hand side of the signal line 2 and the remaining two TFT's 3' and 3'' are on the left-hand side thereof. Two TFT's 3 and 3' are on the lower side of the scanning line 1 and the remaining two TFT's 3" and 3'" are on the upper side thereof. All the gates of the four TFT's are connected to the scanning line 1. All the sources are connected to the signal line 2. The drains of the TFT's 3, 3', 3" and 3'" are respectively connected to lower electrodes of the four liquid crystal display elements to drive liquid crystals 5, 5', 5" and 5'" which are respectively disposed between the lower electrodes and a common upper electrode 6.

The driving circuit panel is shown in FIG. 9, a plurality of scanning lines 1 and a plurality of signal lines 2 are disposed on a glass substrate 10. At every crossing point, four TFT's and four lower electrodes are disposed to form one picture element. The lower electrodes 4, 4', 4" and 4'" are made of a transparent conducting layer of Indium Tin Oxide (ITO), each size being 100 $\mu$m $\times$ 100 $\mu$m. The whole surface is covered with liquid crystal such as the twisted nematic type via a shading layer, a passivation film and an orientation film. A cover cap having a transparent conductive film on the inner surface as the common electrode 6 is disposed on the liquid crystal.

The manufacturing process of this driving circuit panel does not require the multiple wiring techniques, similar to the first embodiment shown in FIGS. 4 and 5. It can be constructed with a standard LSI production technique skilled in the art. As explained in the first embodiment, the production yield is assumed as 99.9%. The display panel is assumed to have a matrix of picture elements of 500 rows and 500 columns. The number of necessary TFT's is 1,000,000. Among them, defective TFT's are 1,000, causing 1,000 non-working liquid crystal display elements. The number of half-defective picture elements, that is, the picture elements in which two TFT's are defective, is 1. The number of ¾ defective picture elements in which three TFT's are defective is 1/1000, that is, one panel among 1,000 panels. The number of completely defective picture element in which four TFT's are all defective is only 1/1,000,000. Thus, according to the second embodiment, the possibility that one picture element is completely defective is negligible. If a part of one picture element is defective, the remaining effective part of the picture element presents information of the picture element with a reduced area. Therefore, even if defective TFT's are involved in the display panel of the second embodiment, they do not affect the visual image on the display panel. Such effect is similarly obtained if the production yield of TFT's is lowered to 99%. The imperfectness of the image on the display panel may be perfectly compensated by driving liquid crystal in the effective parts of the picture elements to make the transmittance 4/3 times when three TFT's are effective in one picture element, two times when two TFT's are effective and four times when one TFT is effective. The control of the transmittance may be achieved by voltage at the signal line which is raised in synchronism with the drive of the set of TFT's including defective TFT or TFT's by using semiconductor memories.

Although some preferable embodiments are explained above, it is apparent for those skilled in the art that the present invention can be successfully applied to other types of liquid crystal display panels and that the above explained embodiment can be variously modified. The twisted nematic type of liquid crystal may be changed with other types of liquid crystal. The thin film MOS field effect transistor as a switching element may be replaced by other thin film active elements such as a junction type thin film field effect transistor, a thin film bipolar transistor or a thin film diode.

What is claimed is:

1. A liquid crystal display panel comprising:
   a plurality of scanning lines arranged in parallel and each receiving a scanning signal;
   a plurality of signal lines arranged in parallel and crossing said scanning lines perpendicularly to form a matrix of crossing points, each of said signal lines receiving a driving signal;
   a plurality of switching elements disposed at said crossing points such that at least a pair of switching elements are disposed at every crossing point and simultaneously switched by the same scanning and signal lines at each of said crossing points; and
   a plurality of liquid crystal display elements coupled with said switching elements, each one of said liquid crystal display elements being associated with one of said switching elements, and said plurality of swtiching elements, when all are nondefective, driving simultaneously all the associated liquid crystal display elements with each driving signal.

2. A liquid crystal display panel as claimed in claim 1, wherein said switching elements are thin film transistors having a control electrode connected to said scanning line, a common electrode connected to said signal line and an output electrode connected to an electrode of the liquid crystal display element.

3. A liquid crystal display panel as claimed in claim 2, wherein the numbers of said transistors and said liquid crystal display elements at each of said crossing points are respectively two.

4. A liquid crystal display panel as claimed in claim 2, wherein the numbers of said transistors and said liquid crystal display elements at each of said crossing points are respectively four.

5. A liquid crystal display panel as claimed in claim 2, wherein said thin film transistors are MOS field efect transistors having a gate connected to said scanning line, a source connected to said signal line and a drain connected to the liquid crystal display element.

6. A liquid crystal display panel as claimed in claim 5, wherein the number of said MOS field effect transistors at each of said crossing points is two.

7. A liquid crystal display panel as claimed in claim 5, wherein the number of said MOS field effect transistors at each of said crossing point is four.

8. A driving circuit of a liquid crystal display panel comprising:
   a substrate having an insulative surface;
   a plurality of scanning lines disposed on said substrate;
   a plurality of signal lines disposed on said substrate and crossing said scanning lines orthogonally forming a matrix of crossing points;
   a plurality of sets of four thin film transistors, one of said sets being disposed adjacent each crossing point of said scanning lines and said signal lines such that each of said thin film transistors are arranged on every quartered plane defined by said scanning and signal lines, each set of said four thin film transistors having control electrodes commonly connected to one of said scanning lines, electrodes commonly connected to one of said signal lines and output electrodes such that each transistor in said set of four thin film transistors is driven by the same scanning and signal lines; and a plurality of electrode pads connected to said output electrodes of said thin film transistors, respectively, to apply driving voltages to liquid crystal through said thin film transistors in response to signals at said scanning and signal lines.

9. A driving circuit of a liquid crystal display panel comprising:

a substrate having an insulative surface;

a plurality of scanning lines disposed on said substrate in parallel;

a plurality of signal lines disposed on said substrate in parallel, said signal lines perpendicularly crossing said scanning lines to form a matrix of crossing points;

a plurality of pairs of thin film transistors, two of said pairs being disposed adjacent each one of said crossing points, one of said pair of thin film transistors being on one side of each of said signal lines, the other of said pair of thin film transistors being on the other side of each of said signal lines, and each of said pairs of thin film transistors having control electrodes connected to the same scanning lines at each of said crossing points, common electrodes connected to the same signal lines at each of said crossing points and output electrodes; and electrode pads respectively connected to said output electrodes of said thin film transistors, said electrode pads applying driving voltages to liquid crystal through said thin film transistors in response to signals at said scanning and signal lines.

10. A driving circuit of a liquid crystal display panel comprising;

a substrate having an insulative surface;

a plurality of scanning lines disposed on said substrate in parallel;

a plurality of signal lines disposed on said substrate in parallel, said signal lines perpendicularly crossing said scanning lines to form a matrix of crossing points;

a plurality of pairs of thin film transistors, one of said pairs being disposed adjacent each one of said crossing points, one of said pairs of thin film transistors being on one side of each of said scanning linses, the other of said pairs of thin film transistors being on the other side of each of said scanning lines, and each of said pairs of thin film transistors having control electrodes connected to the same scanning lines at each of said crossing points, common electrodes connected to the same signal lines at each of said crossing points and output electrodes; and electrode pads respectively connected to said output electrodes of said thin film transistors, said electrode pads applying driving voltages to liquid crystal through said thin film transistors in response to signals at said scanning and signal lines.

* * * * *